(12) United States Patent
Waites

(10) Patent No.: US 7,642,454 B2
(45) Date of Patent: Jan. 5, 2010

(54) ANTI-THEFT APPARATUS FOR AN ELECTRICAL BUSS BAR

(76) Inventor: Kyle Waites, 1100 Tuckahoe Dr., Nashville, TN (US) 37207

(*) Notice: Subject to any disclaimer, the term of this patent is extended or adjusted under 35 U.S.C. 154(b) by 484 days.

(21) Appl. No.: 11/784,739

(22) Filed: Apr. 10, 2007

(65) Prior Publication Data
US 2008/0253063 A1  Oct. 16, 2008

(51) Int. Cl.
*H02G 3/08* (2006.01)
(52) U.S. Cl. .................... 174/50; 174/58; 174/60; 174/64; 439/535; 248/906
(58) Field of Classification Search .......... 174/50, 174/57, 58, 60, 64, 481; 220/3.6, 3.8, 4.02, 220/3.3; 439/535; 248/906
See application file for complete search history.

(56) References Cited

U.S. PATENT DOCUMENTS

| 4,872,847 | A | * | 10/1989 | Fennell et al. | 439/133 |
| 5,934,935 | A | * | 8/1999 | Kameyama | 439/535 |
| 6,194,660 | B1 | * | 2/2001 | Bradt | 174/666 |
| 6,457,988 | B1 | * | 10/2002 | Andersen | 439/373 |

* cited by examiner

*Primary Examiner*—Dhiru R Patel
(74) *Attorney, Agent, or Firm*—Norman B. Rainer

(57) ABSTRACT

Apparatus for preventing theft of a buss bar connected to electrical conductor and grounding cables is provided in the form of a box-like enclosure of thick metal construction which confines the buss bar and has an elongated access opening permitting passage of cables into the enclosure. An aperture within the bottom of the enclosure permits downward emergence of a grounding cable attached to the buss bar.

9 Claims, 3 Drawing Sheets

ANTI-THEFT APPARATUS FOR AN ELECTRICAL BUSS BAR

BACKGROUND OF THE INVENTION

1. Field of the Invention

This invention relates to anti-theft apparatus, and more particularly concerns apparatus for preventing the theft of an electrical buss bar fabricated of copper.

2. Description of the Prior Art

Transmission towers that are employed in the telecommunications industry for broadcasting video and radio media are generally equipped with various cables that conduct electrical current. Such cables require grounding so as to maintain effectiveness and safety. The generally employed technique for grounding a multitude of electrical cables is to cause them to attach to a single buss bar having extremely low electrical resistivity and high thermal conductivity, and the buss bar is connected to a ground line which extends downwardly into the terrain below the buss bar.

The buss bar is generally an elongated flat structure fabricated of copper, and can weigh; 30-100 pounds. In order to accommodate the flow of current from a lightning strike, the buss bar is not located within a shelter or building, but is instead positioned at an unobstructed outdoor location. Because of the currently high economic value of copper metal, the buss bar is often the target of thieves who employ heavy duty tools capable of quickly separating the buss bar from all attachments.

It is accordingly an object of the present invention to provide apparatus for preventing the theft of an electrical buss bar.

It is another object of this invention to provide apparatus as in the foregoing object which does not interfere with the attachment of a number of electrical cables to said buss bar.

It is a further object of the present invention to provide an anti-theft apparatus of the aforesaid nature which is durable with respect to outdoor weathering effects.

These objects and other objects and advantages of the invention will be apparent from the following description.

SUMMARY OF THE INVENTION

The above and other beneficial objects and advantages are accomplished in accordance with the present invention by apparatus for preventing theft of a buss bar connected to electrical conductor and grounding cables, said apparatus comprising:
a) a box-like enclosure of thick metal construction comprised of a bottom panel, top panel, rear panel and opposed identical side panels, said panels being all of substantially rectangular shape and interconnected in a manner that defies separation by non-destructive means, and an installable front panel which, once installed defies removal, said front panel being bounded by interior and exterior faces,
b) an access opening in said enclosure elongated in the direction between said side panels, said access opening permitting passage of electrical cables into said enclosure,
c) attachment means associated with the interior face of said front panel for the securement of a buss bar,
d) a circular aperture substantially centered within said bottom panel, and
e) a collar attached to said bottom panel within said enclosure in centered alignment with said circular aperture, and having radially penetrating locking means.

In a preferred embodiment, an elongated hollow post adapted to vertically penetrate terrain below said enclosure and having an upper extremity interactive with said collar and locking means, and a lower extremity provided with a lateral exit hole which permits radial passage of an electrical grounding conductor emergent from said enclosure.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing.

DESCRIPTION OF THE PREFERRED EMBODIMENT

Figure 1:
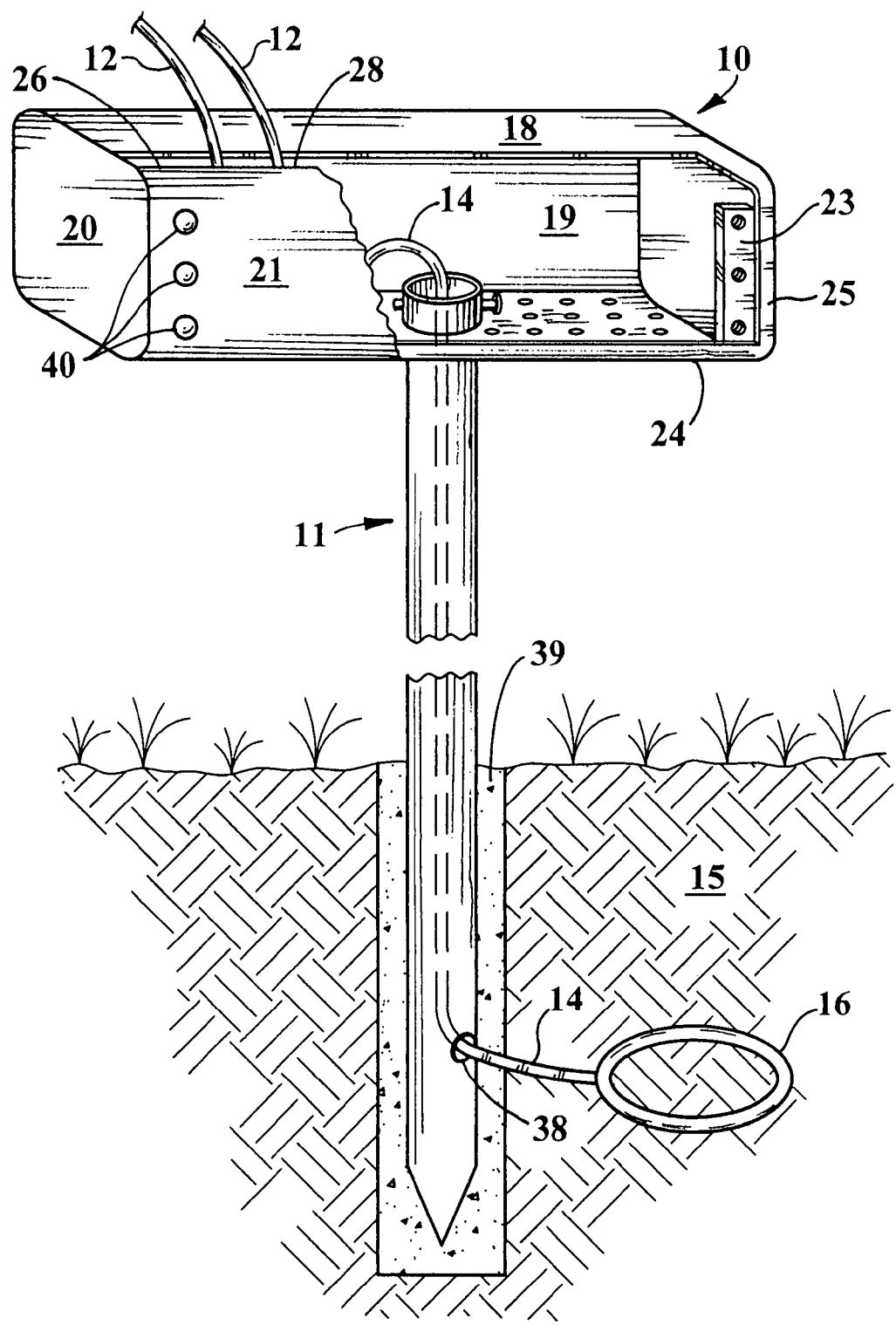
FIG. 1 is a front perspective view of an embodiment of the apparatus of the present invention with portions broken away shown in association with electrical cables and underlying terrain.
Figure 2:
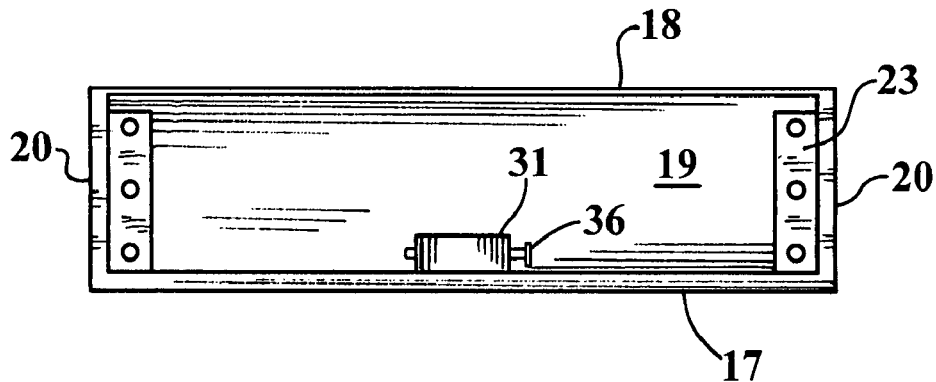
FIG. 2 is a front view of the enclosure component of the apparatus of FIG. 1 shown with its front panel removed.
Figure 3:
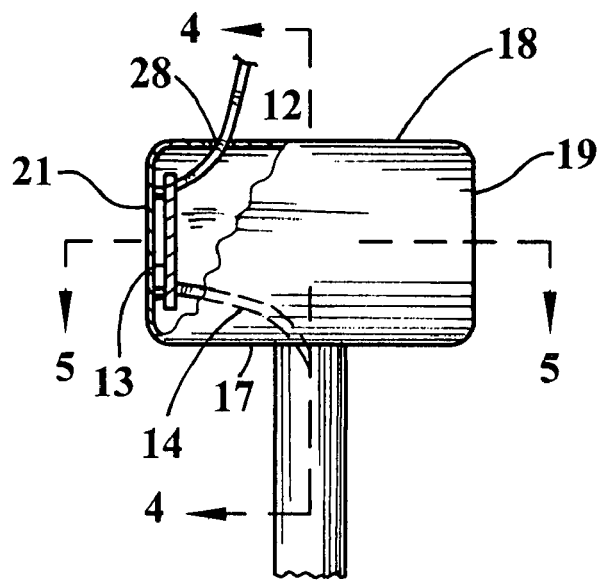
FIG. 3 is a fragmentary side view of the embodiment of FIG. 1 with portions broken away.
Figure 4:
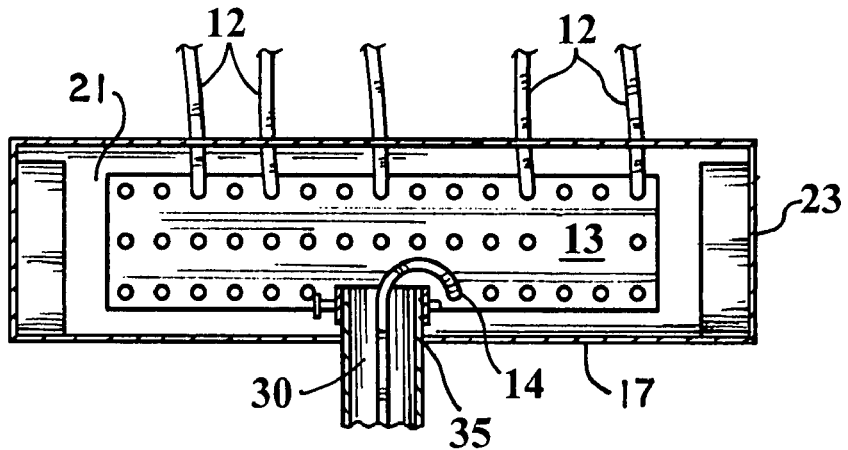
FIG. 4 is a vertical sectional view taken in the direction of the arrows upon line 4-4 of FIG. 3.
Figure 5:
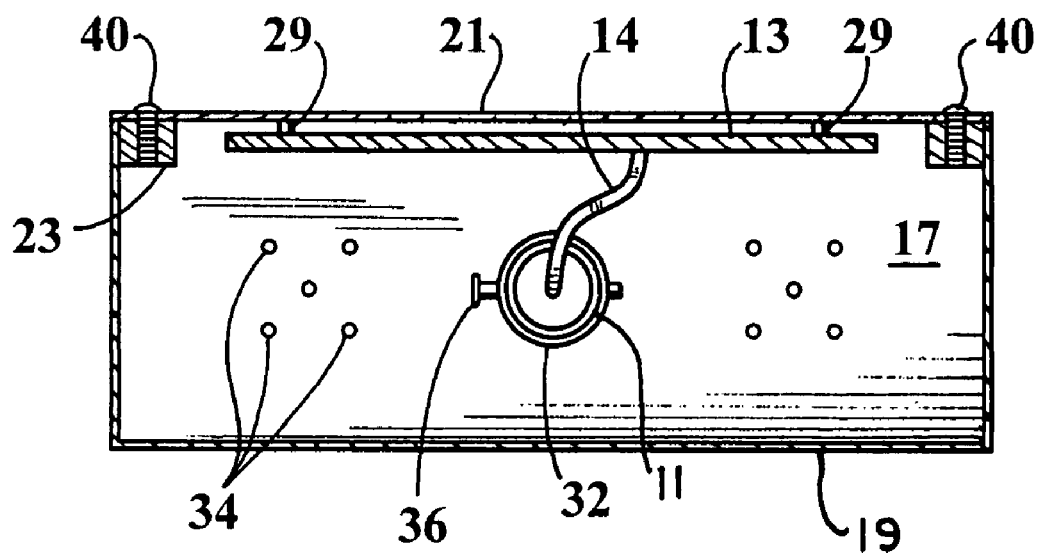
FIG. 5 is a horizontal sectional view taken in the direction of the arrows upon line 5-5 of FIG. 3.
Figure 6:
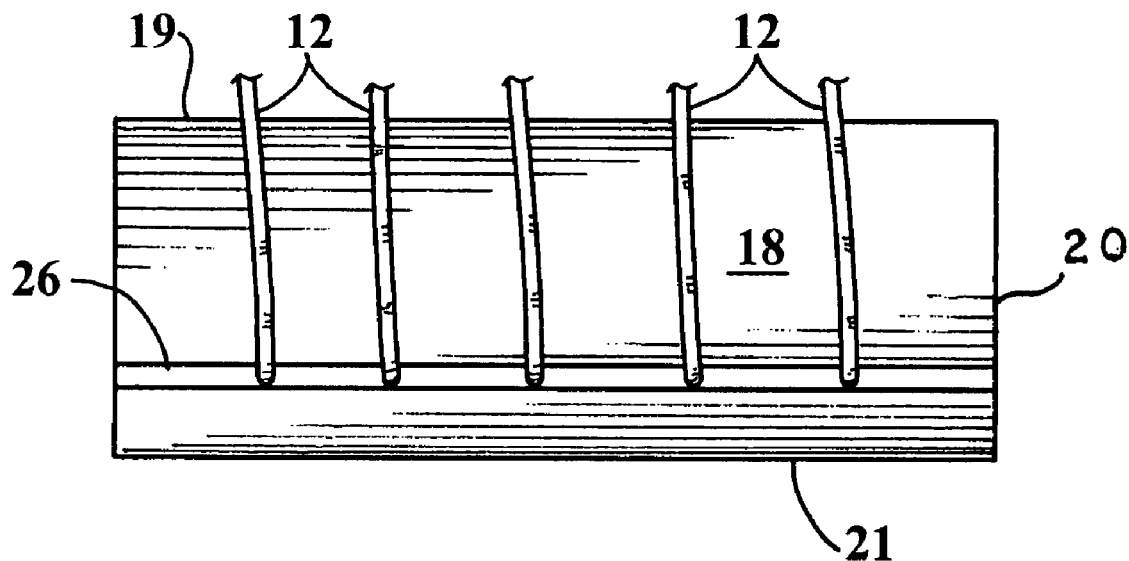
FIG. 6 is a top view.

Referring now to FIGS. 1-6, an embodiment of the anti-theft apparatus of the present invention is shown comprised of enclosure 10 attached atop hollow post 11. Electrical conductor cables 12 enter said enclosure and attach to buss bar 13 secured within said enclosure. At least one ground wire cable 14 attached to said buss bar exits said enclosure by passage downwardly through said hollow post which is embedded in the terrain 15 underlying enclosure 10. The ground wire cable then emerges from post 11 and attaches to a ground ring 16 buried in the terrain adjacent post 11.

Enclosure 10 is of box-like construction, fabricated of thick metal construction and comprised of bottom panel 17, top panel 18, rear panel 19 and identical side panels 20. Said panels are all of substantially rectangular shape, and are interconnected in a manner such as welding and/or tongue and groove interaction that defies separation by non-destructive means. Said panels may be integral portions of a monolithic structure having been made by a molding or extrusion process. Enclosure 10 further comprises an installable front panel 21 which, once installed, defies removal. All said panels are bounded by flat exterior surfaces, and interior surfaces which face the center of the enclosure.

All the panel components of enclosure 10 are preferably fabricated of steel of ¼" to ⅝" thickness, having been hot-dipped galvanized. The length of the enclosure, measured between end panels, may range from about 18 to 35 inches. The height of the enclosure, measured between the interior surfaces of the top and bottom panels may range from about 5 to 9 inches. The depth of the enclosure, measured between the interior surfaces of the front and rear panels may range between about 5 and 9 inches.

In the illustrated embodiment, all exterior corners are rounded, and match a rounded contour of the forward upper portions of side panels 20. Opposed elongated abutment plates 23 are welded to the interior surfaces of side panels 20 at a setback distance equal to the thickness of said front panel. Said abutment plates enable front panel 21 to make a flush installation fit with the forward edge surfaces 24 and 25 of said bottom and side panels, respectively. The rearwardly directed upper edge surface 26 of installed front panel 21 is shown to be spaced away from the forward edge surface of top panel 18, thereby forming a longitudinally extending access opening in the form of slot 28 which permits ingress of cables 12 into enclosure 10. Said slot may, however, be located elsewhere, such as in rear panel 19. Attachment means in the form of threaded bolts 29 secure buss bar 13 to the interior surface of front panel 21.

A circular aperture 30 is centered within bottom panel 17. A metal collar 31 having a circular cylindrical sidewall 32 is welded to the interior surface of bottom panel 17 in surrounding alignment with aperture 30. Drainage holes 34 are present in panel 17 to facilitate outward flow of water that might accumulate within enclosure 10.

Hollow post 11, adapted to insert vertically into the terrain 15 below enclosure 10 has an upper extremity 35 adapted to engage collar 31. Locking means in the form of bolt 36 adapted to penetrate diametrically aligned holes in collar 31 and upper extremity 35 prevents separation of enclosure 10 from post 11. The lower extremity of post 11 has a lateral exit hole 38 which permits radial passage of grounding cable 14 into the surrounding terrain toward joinder with ground ring 16.

In the procedure for installing the apparatus of this invention, a hole is first bored into the terrain to accommodate ground ring 16 and post 11. At least one grounding cable 14 is attached to ground ring 16, then passed through lateral hole 38 and brought upwardly through post 11 to enclosure 10. The annular space 39 between post 11 and the hole bored in the terrain is then filled with concrete. Upper extremity 35 of post 11 is caused to engage collar 31, and locking bolt 36 is insertively emplaced to prevent rotative movement of enclosure 10. The upper extremity of grounding cable 14 emergent from aperture 30 is then attached to a lower portion of buss bar 13. The various electrical conductor cables 12 are then attached to sites on the upper portion of said buss bar, and the buss bar is bolted to the interior face of front panel 21. Said front panel, with cables attached thereto, is then joined to bottom and side panels, 17 and 20, respectively, forming slot 28 which accommodates passage of conductor cables 12. The joinder of front panel 21 to the other panels may be by way of use of threaded bolts 40 which engage abutment plates 23, said bolts having head configurations which defy removal by unauthorized persons. Once the front panel is secured in place, the buss bar is inaccessible without the use of expensive heavy duty demolition equipment that would not likely be used by thieves.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. Apparatus for preventing theft of a buss bar connected to electrical conductor cables, and at least one grounding cable said apparatus comprising:
    a) a box-like enclosure of thick metal construction comprised of a bottom panel, top panel, rear panel and opposed identical side panels, said panels being all of substantially rectangular shape and interconnected in a manner that defies separation by non-destructive means, and an installable front panel which, once installed defies removal, said front panel being bounded by interior and exterior faces,
    b) a slot elongated in the direction between said side panels, said slot permitting passage of said conductor cables into said enclosure,
    c) attachment means associated with the interior face of said front panel for the securement of a buss bar,
    d) a circular aperture substantially centered within said bottom panel, and
    e) a collar attached to said bottom panel within said enclosure in centered alignment with said circular aperture, and having diametrically penetrating locking means.

2. The apparatus of claim 1 further comprising an elongated hollow post adapted to vertically penetrate terrain below said enclosure and having an upper extremity interactive with said collar and locking means.

3. The apparatus of claim 2 wherein said at least one grounding cable passes downwardly through said circular aperture and into said post.

4. The apparatus of claim 3 wherein said post has an exit hole which permits radial passage of said at least one grounding cable.

5. The apparatus of claim 4 wherein said at least one grounding cables, following passage through said post, attaches to a ground ring buried in said terrain.

6. The apparatus of claim 5 wherein said post, where it penetrates said terrain, is embedded in concrete.

7. The apparatus of claim 1 further comprising abutment plates within said enclosure that enable said front panel to be installed in a recessed manner so as to make flush fitting joinder with said side and bottom panels.

8. The apparatus of claim 1 wherein said slot is bounded by said front and top panels.

9. The apparatus of claim 8 further comprising drainage holes in said bottom panel to permit egress of any accumulated water.

* * * * *